June 6, 1950 — J. W. EKSTEDT ET AL — 2,510,213
GEOGRAPHICAL GLOBE
Filed March 28, 1945 — 5 Sheets-Sheet 1

Inventor
John W. Ekstedt
Albert F. Pityo
Harry Butterfield,
By
Attorney

June 6, 1950   J. W. EKSTEDT ET AL   2,510,213
GEOGRAPHICAL GLOBE

Filed March 28, 1945   5 Sheets-Sheet 3

Inventor
John W. Ekstedt
Albert F. Pityo
Harry Butterfield
By
Attorney

June 6, 1950  J. W. EKSTEDT ET AL  2,510,213
GEOGRAPHICAL GLOBE

Filed March 28, 1945　　　　　　　　　　　　　　　5 Sheets-Sheet 4

Inventor
John W. Ekstedt
Albert F. Pityo
Harry Butterfield,

By
Attorney

June 6, 1950   J. W. EKSTEDT ET AL   2,510,213
GEOGRAPHICAL GLOBE

Filed March 28, 1945   5 Sheets-Sheet 5

Inventor
John W. Ekstedt,
Albert F. Pityo
Harry Butterfield,
Attorney

Patented June 6, 1950

2,510,213

UNITED STATES PATENT OFFICE 2,510,213

GEOGRAPHICAL GLOBE

John W. Ekstedt, Union, Albert F. Pityo, Clifton, and Harry Butterfield, Maplewood, N. J.

Application March 28, 1945, Serial No. 585,326

25 Claims. (Cl. 35—46)

Our invention relates to hollow spherical bodies and has particular reference to geographical globes.

An important object of the invention is to produce a globe provided with a map including figures, designs, lines or the like, parts of which will accurately register in the completed globe.

A further object of the invention is to provide a globe formed of absorbent fibrous material, such as paper, coated or impregnated with plastics material.

A further object of the invention is to provide a globe formed in whole or in part of plastics material and which is a unitary structure, strong and durable.

A further object of the invention is to provide a globe having its outer circumference accurately controlled so that a variation in the thickness of the stock employed will not cause parts of the map to be out of alignment, or cause abutting edges to spread, leaving spaces between the edges.

A further object of the invention is to provide reinforcing means for securely uniting the edges of the hemispherical globe sections at the meeting line.

A further object of the invention is to provide a globe having the map designations covered and protected by a layer of transparent or translucent plastics material.

A further object of the invention is to provide a globe having portions of its designations placed upon one part of the globe and visible without internal illumination and other designations placed upon another portion of the globe and visible with internal illumination.

A further object of the invention is to provide a globe formed in whole or in part of plastics material and having designations directly printed, engraved or pressed thereon.

Other objects and advantages of the invention will be apparent during the course of the following description.

The present application is a continuation in part of our co-pending application for Method of making hollow spheres, filed December 1, 1944, Serial No. 566,154.

In the accompanying drawings forming a part of this application and in which like numerals are employed to designate like parts throughout the same, Figure 5 is a similar view of a further modified blank.

The apparatus used in the practice of the method comprises mold sections 20 and 21, having hemispherical recesses 22 adapted to be brought into registration and the meeting edges forming a line 23. The mold sections 20 and 21 are held together by any suitable means to maintain the recesses 22 in accurate registration. The assembled recesses produce a spherical mold recess or cavity, having the same diameter throughout its entire area, which accurately defines the exterior circumference of the globe to be formed, whereby such exterior circumference has the same diameter throughout its entire area and abutting portions of the formed blank have truly flush outer surfaces. The mold section 20 is provided at its top with an opening 24, which is tapered and increases in diameter upwardly. This opening receives a removable tapered plug 24', held in place by a sliding clamp 25, having a slot 26 to receive a clamping screw 27, attached to the upper mold section 20.

The numeral 28 designates a flexible rubber bladder equipped with a tube 29 for insertion through the opening 30. When deflated, the flexible bladder 28 may be passed through the opening 24, when the plug 24' is removed.

Figures 7, 16:
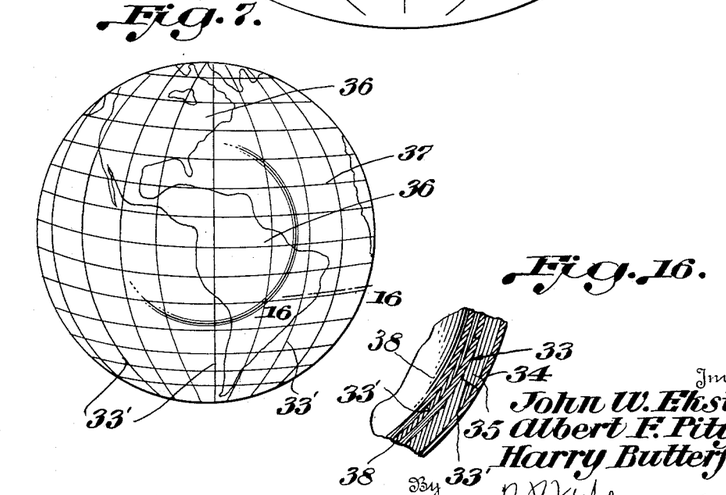
Figure 7 is a side elevation of the completed globe.
Figure 16 is a detailed section taken on line 16—16 of Figure 7.
Figure 10:
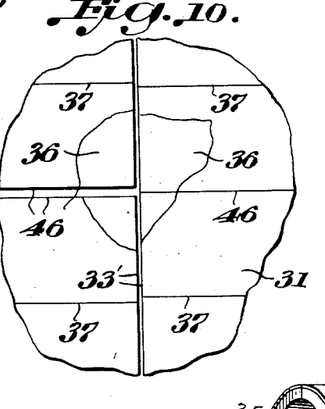
Figure 10 is an enlarged fragmentary side elevation of the globe produced in Figure 8.
Figure 11:
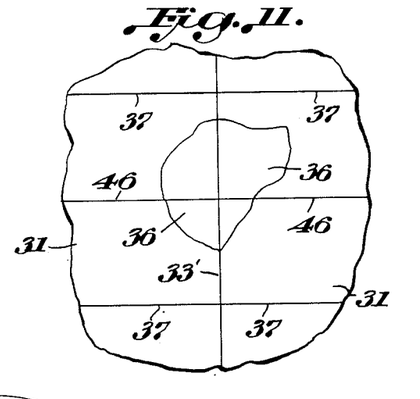
Figure 11 is a similar view of the globe produced in Figure 9.
Figure 12:
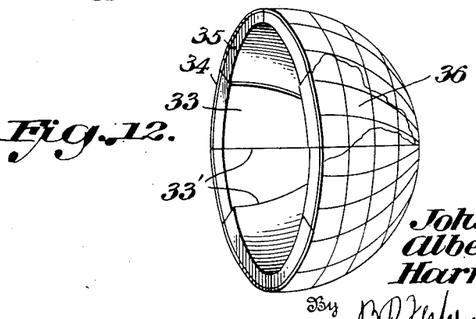
Figure 12 is a perspective view of the hemisphere included in the globe of Figure 9.

In the formation of the sphere or globe, we employ circular blanks 31, in forming each hemispherical globe section. The blank has radial inwardly tapering openings 32 cut therein, forming radial blank sections 33. Each blank 31 is formed of paper, including an outer smooth or hard or dense paper layer 34, and an inner highly porous and absorbent paper layer 35, such as used on ink blotters, and these two layers are securely united or formed integral. The outer hard or smooth or dense layer 35 has parts of a map or design or other data printed or otherwise formed upon its outer face. As more clearly shown in Figures 7, 10 and 11, the map design may include parts of land 36 and circumferentially extending line sections 37 parallel with the equator so that when the blank is formed into the hemisphere parts, the parts of the map will be properly assembled to produce the map. Of course the map includes the usual geographical representations of various land and water objects of the world, and other suitable designations. The blank 31 now has its inner porous layer 35 impregnated with a liquid plastics material. This plastics material may be a thermo-setting plastics compound. The layer 35 may be impregnated with the thermo-setting plastics compound by coating the same with the compound, which may be dissolved in a solvent, such as alcohol, or the dissolved plastic compound may be sprayed upon the layer 35. If desired, the entire blank may be submerged in the dissolved plastics compound and both layers will then be impregnated with the plastics compound. The plastics compound is of course uncured. We may employ any of the phenolic plastic compounds, such as "Bakelite," "Duroz," or "Durite," or any other thermo-setting plastics material. The blank thus treated is allowed to dry and is then introduced into the mold cavity 22 and formed into the hemisphere, with the free ends of the radial extensions 33 terminating at the meeting line 23. After the outer blank 31 is introduced into the mold cavity 22, we introduce into the formed outer blank 31 a plurality of blanks 38, which are substantially identical in construction to the blank 31, except that each blank 38 is formed of a single layer of ordinary stout paper or cardboard. The blanks 38 before being introduced into the formed outer blank are impregnated or coated with the thermo-setting plastics compound, which is allowed to dry. Each dried blank 38 is formed into a hemisphere, and the several blanks are arranged so that their radial edges of the radial sections 33 abut and break joint, Figure 16. The thermo-setting plastics material impregnating the blanks 38 is at this time uncured.

Figure 3:
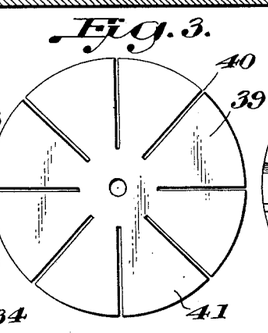
Figure 3 is a plan view of a modified blank.

In Figure 3, we have shown a blank which may be used in the place of the blanks 31 and 38. This blank is designated by the numeral 39 and has radial slits 40, forming radial sections 41, which fold over each other so that the blank 39 may be formed into the hemisphere when introduced into the recess 22.

Figure 4:
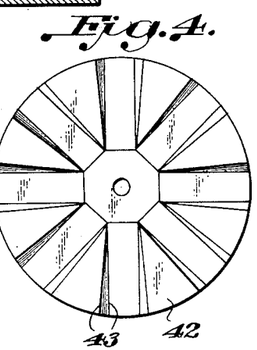
Figure 4 is a similar view of a further modified blank.
Figure 6:
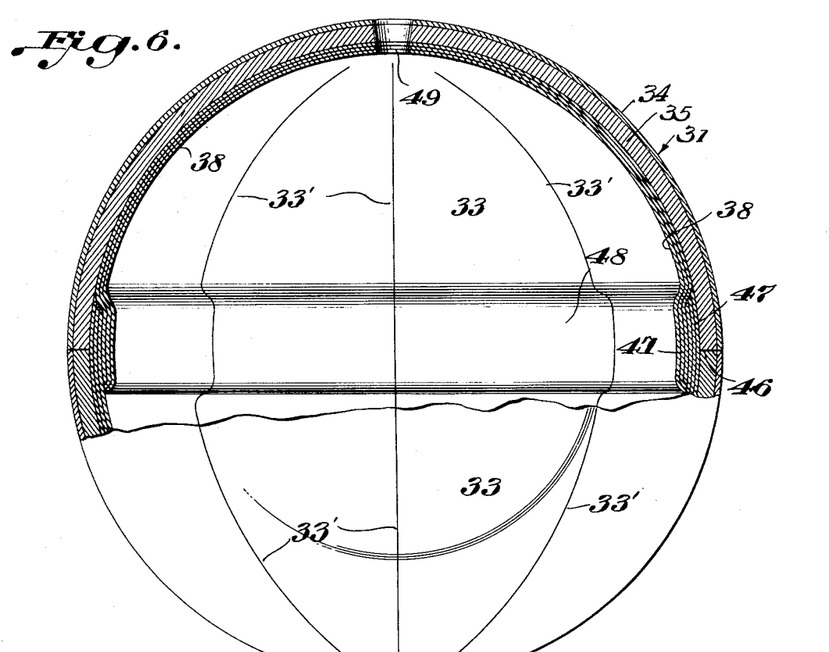
Figure 6 is a side elevation, parts in central vertical section through the completed globe embodying the invention, the geographical designations being omitted.

In Figure 4, we have shown a blank which may be substituted for the blanks 31, 38 and 39. This blank is designated by the numeral 42 and has radial scores 43, so that the blank may be readily folded, to produce the hemisphere when introduced into the cavity.

Figure 2:
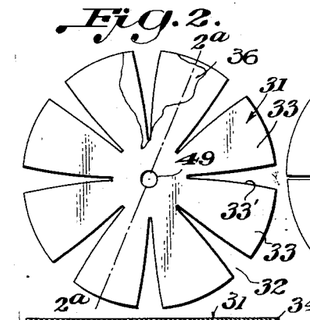
Figure 2 is a plan view of a blank employed in the practice of the method for producing our globe, Figure 2ª is a section taken on line 2a—2a of Figure 2.
Figures 2A, 5:
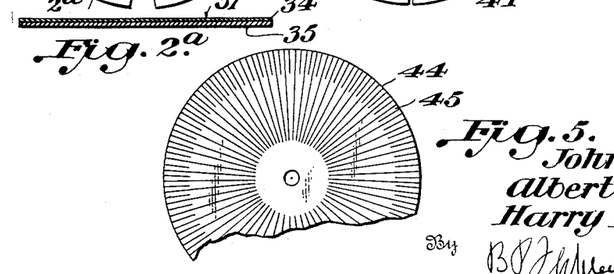

In Figure 5, we have shown a blank 44 which may be substituted for blanks 31, 39 and 42. This blank 44 has radial corrugations 45. The blank 44 is introduced into the recess 22 and may be readily formed into the hemisphere globe section. The blanks 39, 42 and 44 may be formed of the two layers, as described in connection with blank 31, when such blanks are arranged outermost in the mold recess or cavity, or formed of a single layer when arranged within the outer layer, like the layers 38. The various blanks 39, 42 and 44 are formed of paper, as is obvious.

We also contemplate using any suitable thermoplastic compound instead of the thermo-setting compound.

By introducing the blanks 31 and 38 into the mold cavity 22, a hemisphere is formed within each cavity, and this hemisphere is laminated and includes a plurality of blanks or layers 34, 35 and 38, impregnated or coated with a dry, uncured thermo-setting plastics compound. The free edges 46 of the hemispheres produced by the blanks 31 abut and terminate at the meeting line 23. The inner blanks 38 are of larger diameter than the blanks 31 and when formed into the hemispheres, their free edge portions overlap each other and overlap the edges 46. One edge portion 47 of the blanks 38 may be bent inwardly so that it will readily telescope with the companion edge portion 47. The innermost layer 38 in each set has its inner face free from the plastics material or covered by a layer or blank so that it will not adhere to the bladder 28. The blanks 31 and 38 arranged within the upper cavity 22 have an opening 49 formed therein, to register with the opening 24. These blanks in the lower cavity may or may not have this opening. Before the mold sections 20 and 21 are assembled, the bladder 28 may be introduced into the upper cavity and its tube 29 extended through the opening 30.

After the several blanks or layers are thus assembled in the mold cavities 22, the mold sections 21 and 20 are brought together so that the mold cavities accurately register and are held in the closed position. The edges 46 now abut, and the longitudinal or radial edges 33' of the radial blank sections 33 abut, while the edge portions 47 overlap each other and the edges 46. The tube 29 is now connected with a source of fluid pressure, such as compressed air, which is supplied to the bladder 28 until a pressure is built up therein from atmospheric pressure to from 50 to 100 pounds per square inch. This pressure is transmitted to the layers of the hemispheres, producing an outer smooth surface and smoothing out the folded portions. It also presses the abutting edges firmly together, and the overlapping edge portions firmly together, so that these various parts are bonded together in contacting relation. The pressure is maintained for a suitable time until the uncured thermo-setting plastics material is cured. The curing may be effected with or without heat, depending upon the thermo-setting plastics material used. If desired, the mold sections 20 and 21 may be heated. The bladder 28 may be filled with any suitable fluid under pressure, such as air, water or gas, hot or cold.

Figures 8, 9:
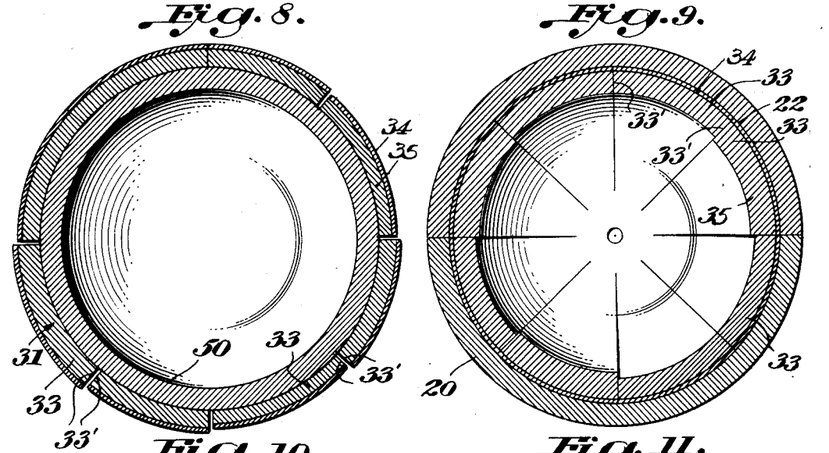
Figure 8 is a section through a hollow globe taken parallel with the equator and formed upon an internal core, the variance in the thickness of the stock being exaggerated for the purpose of illustration.
Figure 9 is a similar view showing the hollow globe formed within a spherical mold cavity, the variance in thickness of the stock being exaggerated for the purpose of illustration.

One difficulty encountered in connection with the manufacture of hollow globes from paper stock is that the stock varies in thickness throughout its area, to some extent. In Figure 8, the radial blank sections 33 of blank 31 are shown formed upon an internal spherical mold or core 50. By this arrangement, the inner face of the formed hemisphere is accurately spherically curved, but due to irregularities in the thickness of the paper stock, the outer surfaces of the radial sections 33 may extend beyond each other for slight distances, as shown. This has been somewhat exaggerated in Figure 8, for the purpose of illustration. The exterior diameters of the radial sections 33 are therefore found to somewhat vary, and although this variance in diameter may be slight, yet when translated into circumference, it becomes considerable. The result is that due to variance in the thickness of the stock, the map parts 36 and lines 37 do not accurately register, Figure 10. Further, the abutting edges 33 and the edges 46 at the equator are spread, producing spaces, as shown.

In Figure 9, the hemispherical globe section is formed within the spherically curved mold cavity 22, in accordance with the present method. The spherically curved wall of the cavity 22 therefore accurately defines or shapes the spherical outer face of the assembled radial sections 33 and accurately defines their exterior diameters, and the variance in the thickness of the stock, causes the inner faces of the radial blank sections 33 to project unevenly beyond each other. It is thus seen that the exterior diameter of the formed hemisphere is maintained constant, whereby the map parts 36 and the lines 37 accurately register, Figure 11. Further, the abutting edges 33' and the edges 46 at the equator substantially contact, the blank being of a uniform size. Figure 9 exaggerates the variance in thickness of the stock for the purpose of illustration.

By the use of the bladder 28, a yielding internal pressure is applied to the inner face of the formed hemispherical globe section or globe, thus permitting of a uniform pressure applied to all surfaces of the blanks, regardless of the variance of internal diameters, due to variance in the thickness of the stock. This could not be accomplished by means of a rigid applied force, as it is impossible to appreciably compress dense paper.

Figure 13:
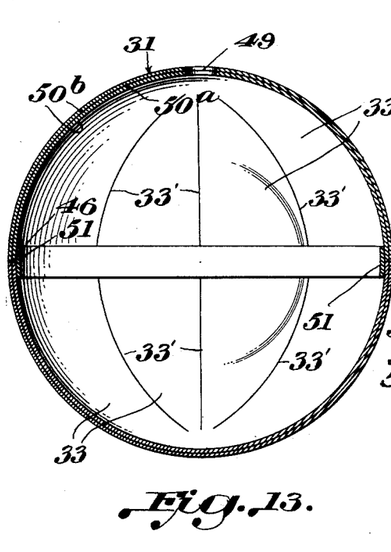
Figure 13 is a central vertical section through a modified form of globe embodying our invention.
Figure 14:
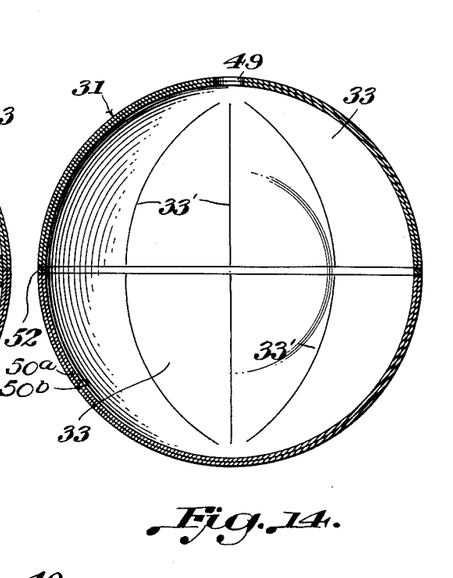
Figure 14 is a similar view showing a further modified form of globe.
Figure 15:
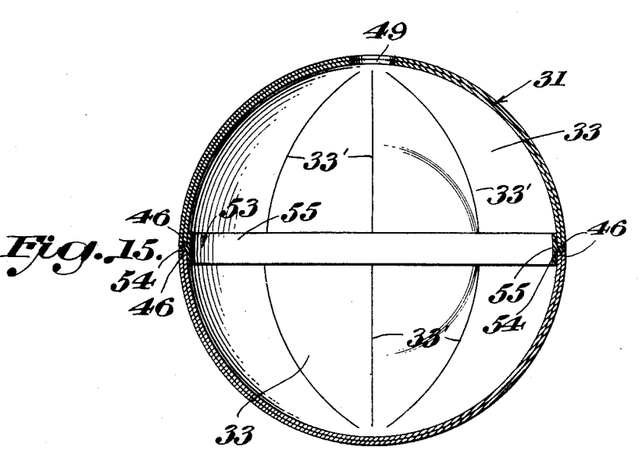
Figure 15 is a similar view through a further modified globe.

In Figures 13, 14 and 15, the blanks 31 are employed, which are circular and cut as shown in Figure 2, providing radial sections 33 and radial openings 32 to permit of the blanks being formed into the hemispheres. In Figures 13, 14 and 15, the blanks 31 are shown as formed of a single layer of stout paper 51a, impregnated with thermo-setting plastics material 50b, which is uncured. Any of the thermo-setting plastics materials previously described may be employed.

The blank 31 may be immersed in the uncured thermo-setting plastics material dissolved in a volatile solvent, and the plastics material is then allowed to dry. The plastics material forms a unitary structure with the paper 50a, which has its inner and outer faces covered or coated by layers of the thermo-setting plasticts material. This is clearly shown in Figure 17. Before the paper 50a is impregnated with the thermo-setting plastics material, such paper has the geographical designs or data 36 and the lines 37 printed or formed upon its outer face, Figure 18. The thermo-setting plastics material 50b is transparent or translucent, so that the design 36 and lines 37 or the like are visible through the plastics material.

As shown in Figure 13, the inner blanks 38 are dispensed with, and an annular band 51 is arranged within the formed hemispherical globe sections overlapping the abutting edges 46. This band may be formed of uncured thermo-setting plastics material, or paper impregnated with such thermo-setting plastics material.

In Figure 14, we have shown a further modification wherein the blanks 38 are dispensed with and an annular band or ring 52 is arranged between the edges 46. This band or ring is formed of uncured thermo-setting plastics material or paper coated with or impregnated by such material.

In Figure 15, we have shown a further modification wherein the blanks 38 are dispensed with and a ring 53 is used. This ring includes a web 54 arranged between the edges 46 and a web 55 overlapping these edges. The ring 53 is T-shaped in cross section. The ring 53 is formed of uncured thermo-setting plastics material or paper coated or impregnated with such material.

Figure 1:
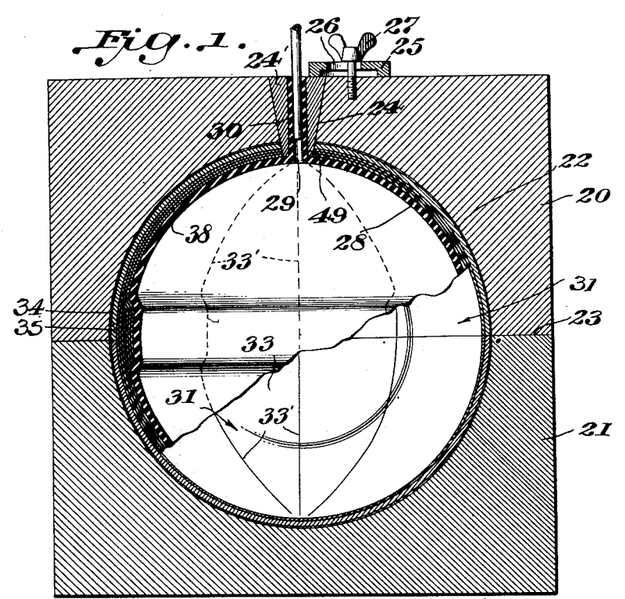
Figure 1 is a central vertical section through a mold, showing a globe embodying our invention being formed therein.

The assembled hemispherical globe sections shown in Figures 13, 14 and 15 are arranged within the mold shown in Figure 1, and are subjected to the action of heat and pressure, as described in connection with Figure 1. The thermo-setting plastics material of the various parts is thereby cured, and the various parts are welded together, forming a strong unitary device.

Figure 17:
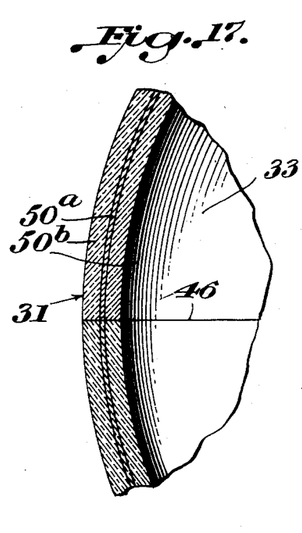
Figure 17 is an enlarged detailed section through the blanks included in the globe of Figures 13 to 15 inclusive.
Figures 18, 19, 20:
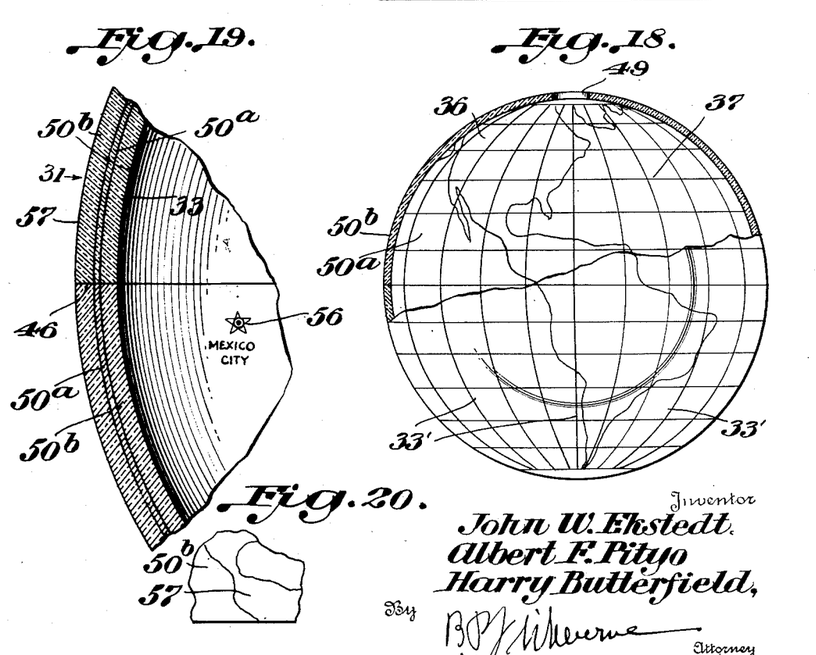
Figure 18 is a side elevation of the globe shown in Figures 13 and 17, the outer layer being partly broken away.
Figure 19 is a view similar to Figure 17, showing printing upon the inner and outer faces of the globes.
Figure 20 is a fragmentary side elevation of the globes shown in Figure 19, showing the printing upon the outer face, and, Figure 21 is a central vertical section through a mold and a modified form of globe formed therein.

Figure 19 shows the same blanks 31 of Figure 17, formed of a single layer of paper 50a impregnated with the dried thermo-setting plastics material 50b. We also contemplate, while the blank 31 is flat and before it is formed into the hemisphere, forming or printing geographical designations or data upon the inner face of the plastics material 50b, and this is shown at 56, Figure 19. When the paper 50a is impregnated with the plastics material, it is rendered translucent. By forming the designs 36 and lines 37 or data upon the outer face of the paper 50a, the same is visible from the exterior, when the globe does not have interior illumination, but the interior design or data 56 is then not visible. However, when the translucent globe has internal illumination, the interior design or data 56 is rendered visible from the exterior as well as the exterior design or data 36 and 37. We also contemplate printing or forming geographical design or data 57 upon the outer face of the plastics material 50b, Figures 19 and 20, and this design or data 57 may be used with or without the other design or data. The design or data 57 may embrace any or all representations of the geographical parts of the earth.

Figure 21:
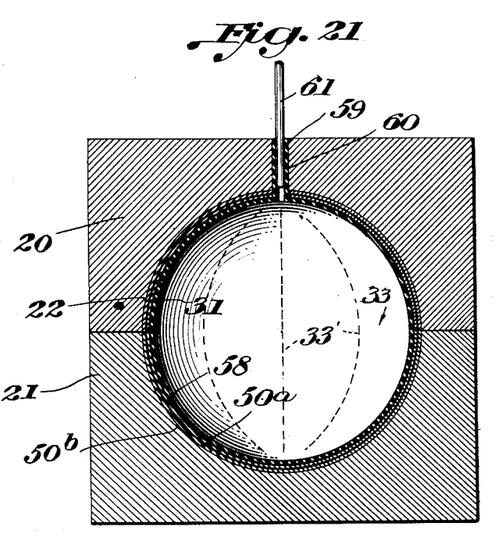

A further modification of the invention is shown in Figure 21. In this figure, the blanks 31 of Figure 13 are preferably employed and arranged within the cavities 22 of the mold sections 21. The same mold is employed as shown in Figure 1. In Figure 21, the blanks 38 are dispensed with and also the band 51. The rubber bladder 28 is dispensed with and we employ a bladder 58, arranged within the formed hemispheres. This bladder 58 is formed of uncured thermo-setting plastics material and is dried. The bladder 58 is suitably flexible and elastic. The bladder 58 has a tube 59, passing through an opening 60 formed in the upper mold section 21. The opening 24 and plug 24', Figure 1, are omitted. Compressed air is supplied into the bladder through a pipe 61 extending into the tube 60. The parts thus assembled within the mold are subjected to heat and pressure for curing the thermo-setting plastics bladder 58 and the thermo-setting plastics material of the blanks 31. The thermo-setting plastics material is therefore cured and the several parts are bonded together to produce a unitary structure. The bladder 58 remains a permanent part of the globe, and the tube 60 is severed at the outer face of the globe. The same manner of printing the geographical designs, representations or data, upon the paper 50a of the blank 31, and upon the inner or outer faces of the thermo-setting plastics material 50b, of the blanks in Figure 21, is followed as shown and described in connection with the forms of the invention shown in Figures 17 and 19.

It is to be understood that the forms of my invention herewith shown and described are to be taken as preferred examples of the same, and that various changes in the shape, size, and arrangement of parts may be resorted to without departing from the spirit of my invention or the scope of the subjoined claims.

Having thus described our invention, what we claim is:

1. A globe comprising a formed sheet of fibrous absorbent material having geographical designations directly applied thereto and impregnated with cured thermo-setting plastics material.

2. A globe comprising a formed sheet of fibrous absorbent material having geographical designations directly printed thereon and having plastics material applied thereto.

3. A globe unit comprising fibrous absorbent formed blanks arranged in superposed relation, the outer blank having geographical designations directly formed thereon, said blanks being impregnated with cured thermo-setting plastics material and bonded together to form a unitary structure.

4. A globe comprising formed paper blanks having their outer faces provided with geographical designations directly formed thereon and having a light transmitting plastics material applied thereto which covers the outer faces.

5. A globe comprising formed substantially circular paper blanks having radial sections having geographical designations directly formed thereon and impregnated with cured thermo-setting plastics material, the ends of the blanks being arranged in close relation and the longitudinal edges of the radial sections being arranged in abutting relation, all parts of the blanks being welded together by the plastics material.

6. A globe comprising substantially circular paper blanks having radial sections having designations applied thereto and moveable therewith and having cured thermo-setting plastics material applied thereto, the blanks being formed to provide spherically curved globe sections, the radial sections when in the assembled position causing the designations to register to produce geographical designations, the globe sections having a uniform exterior diameter regardless of the variance of the thickness of the blanks so that such designations will properly register, the globe sections being bonded together to form a unitary structure.

7. A globe comprising substantially circular paper blanks having radial sections having geographical designations formed thereon and moveable therewith so that such designations register when the radial sections are in the assembled position and having cured thermo-setting plastics material applied thereto, the blanks being formed into spherically curved globe sections having their ends arranged in abutting relation, the longitudinal edges of the radial sections being arranged in abutting relation, a band arranged within the abutting ends of the globe sections to connect them, the plastics material of the radial sections bonding them together, said globe sections having a uniform exterior diameter.

8. A globe comprising substantially circular paper blanks having radial sections having geographical designations directly formed thereon and moveable therewith to substantially register when the sections are moved to the assembled position and impregnated with cured thermo-setting plastics material, the blanks being formed into spherically curved globe sections having their ends arranged in abutting relation, the longitudinal edges of the radial sections being arranged in abutting relation, a band embodying cured thermo-setting plastics material arranged upon the interior of the globe sections and overlapping the abutting ends of the same and bonded to such globe sections, said globe sections having this outer circumference accurately spherically curved.

9. A globe comprising substantially circular paper blanks having radial sections provided with geographical designations which substantially register when the sections are assembled and impregnated with cured thermo-setting plastics material, the blanks being formed into spherically curved globe sections having their inner ends arranged in adjacent abutting relation, a ring embodying cured thermo-setting plastics material arranged within the globe sections, said ring comprising a band to engage the inner faces of the globe sections and carrying an outwardly projecting band arranged between the abutting ends of the globe section, the first-named band being bonded to the inner surfaces of the globe sections and the second-named band being bonded to the abutting ends of the globe sections, said globe sections having their outer circumference accurately defined.

10. A globe comprising substantially circular paper blanks having geographical designations directly formed thereon and impregnated with cured thermo-setting plastics material and formed into spherically curved globe sections having their inner ends arranged in abutting relation, and a band embodying cured thermo-setting plastics material arranged between the abutting ends of the globe sections and bonded to such ends.

11. A globe comprising substantially circular blanks, each blank comprising an outer dense paper sheet and an inner highly porous paper sheet, each blank having radial openings forming radial sections, the radial sections of the outer sheet having designations and moveable therewith the blanks being impregnated with cured thermo-setting plastics material and formed into spherically curved globe sections having their inner ends arranged in abutting relation, the longitudinal edges of the radial sections being arranged in abutting relation, the longitudinal edges being bonded together by the plastics material and the designations of the radial sections registering to produce geographical designations when the radial sections are assembled, the globe sections having their outer circumference accurately defined.

12. A globe comprising substantially circular paper blanks impregnated with cured thermo-setting plastics material and formed into spherically curved globe sections having their inner ends arranged in abutting relation, the globe sections having geographical designations, and inner blanks arranged within the globe sections and formed into inner globe sections and impregnated with cured thermo-setting plastics material, the inner globe sections having their inner ends overlapping and overlapping the inner ends of the outer globe sections, the inner globe sections being bonded to each other and to the outer globe sections.

13. A globe comprising substantially circular blanks, each blank comprising a layer of paper impregnated with cured thermo-setting plastics material forming layers of such plastics material upon opposite sides of the paper layer, each blank being cut to provide radial sections which have geographical designations directly formed thereon and covered by the plastics material the blanks being formed into spherically curved globe sections assembled so that their inner ends are in close relation, the longitudinal edges of the radial sections abutting the plastics material bonding the radial sections together.

14. A globe comprising substantially circular blanks, each blank comprising a layer of paper impregnated with a cured light transmitting thermo-setting plastics material, each blank being radially cut to provide radial sections, the blanks being formed into spherically curved globe sections, the paper layers of the globe sections having geographical designations upon their outer faces, the plastics material rendering the paper layer translucent, and at least one globe section having an interior designation which is visible when the globe has interior illumination.

15. A globe formed of blanks formed into substantially hemispherical globe sections embodying cured thermo-setting plastics material and assembled to produce the globe, and a pressure receiving bladder arranged within the assembled globe sections and embodying cured thermo-setting plastics material, the bladder being bonded to the globe sections and forming a permanent part of the globe.

16. A globe formed of assembled substantially hemispherical globe sections having geographical designations, and a pressure receiving bladder arranged within the globe and formed of cured thermo-setting plastics material, the bladder being bonded to the globe sections and constituting a permanent part of the globe.

17. A globe formed of assembled substantially hemispherical globe sections having geographical designations, and a hollow globe member within the first-named globe and embodying cured thermo-setting plastics material, the globe member being bonded to said globe.

18. A globe comprising assembled substantially hemispherical globe sections having geographical designations, and a pressure receiving bladder within the globe and bonded to the globe sections and forming a permanent part of the globe.

19. A globe section comprising a substantially circular paper blank having radial sections having geographical designations applied thereto and moveable therewith and having a plastics material applied thereto, the blank being formed into the spherically curved globe section, the globe section having a uniform exterior diameter regardless of the variance in thickness of the blank.

20. A globe section comprising a substantially circular paper blank having a plastics material applied thereto and having radial sections provided with geographical designations printed upon their outer faces which extend to the longitudinal edges of the radial sections, the blank being formed into the spherically curved globe section, the globe section having a uniform exterior diameter regardless of the variance in thickness of the blank and the longitudinal edges of the radial sections being disposed in close relation whereby the geographical designations will accurately register when the radial sections are assembled.

21. A globe section comprising a substantially circular outer paper blank having radial sections having geographical designations directly formed thereon and moveable therewith and impregnated with a thermo plastics material, the blank being formed into the spherically curved globe section, and an inner substantially circular paper blank having radial sections and having a greater diameter than the outer paper blank, the inner paper blank being impregnated with a thermo plastics material and formed into an inner globe section having its open end extending outwardly beyond the open end of the outer globe section, the two globe sections being bonded together by the thermo plastics material.

22. A globe comprising substantially circular paper blanks having radial sections having geographical designations formed thereon and moveable therewith and impregnated with a thermo plastics material, the blanks being formed into spherically curved globe sections having their ends arranged in abutting relation, an inner substantially circular paper blank having radial sections and impregnated with thermo plastics material and having a greater diameter than the first named blanks, the inner blank being formed into a globe section which is arranged within one of the first named globe sections and has its open end projecting beyond its globe section and extending into the companion outer globe section, the inner globe section being bonded to the outer globe sections by the thermo plastics material.

23. A spherically curved globe section comprising a plurality of outer and inner circular fibrous blanks arranged in lapping relation, the blanks having radial sections, the radial sections of the outer blank having geographical designations extending adjacent to the longitudinal edges of the radial sections, the blanks having plastics material applied thereto, the overlapping blanks being formed into the spherically curved globe section, the geographical designations of the radial sections registering, and the plastics material bonding the layers together, the spherically curved section having a uniform exterior diameter.

24. A spherically curved globe section having a uniform exterior diameter, comprising a plurality of outer and inner circular fibrous blanks arranged in lapping relation, the blanks having radial sections, the radial sections of the outer blank having geographical designations applied thereto and moveable therewith and extending adjacent to the longitudinal edges of the radial sections, the blanks having plastics material applied thereto, the overlapping blanks being formed into the spherically curved globe sections, the radial sections of each formed blank having their longitudinal edges arranged in close relation, and the radial sections of one formed blank having their longitudinal edges arranged to break joint with the longitudinal edges of the radial sections of the other formed blank, the geographical designations of the radial sections of the outer formed blank registering, and the plastic material bonding the blanks together.

25. A globe having a uniform exterior diameter, comprising spherically curved globe sections, each globe section comprising a plurality of outer and inner circular fibrous blanks arranged in lapping relation, the blanks having radial sections, the radial sections of the outer blank having geographical designations applied thereto and moveable therewith and extending adjacent to the longitudinal edges of the radial sections, the blanks having plastics material applied thereto, the overlapping blanks being formed into the globe sections, the radial sections of each formed blank having their longitudinal edges arranged in close relation, the geographical designations of the radial sections of each outer formed blank registering, the globe sections having their open ends arranged in close relation, and a band arranged within the open ends of the globe sections and secured to such globe sections.

JOHN W. EKSTEDT.
ALBERT F. PITYO.
HARRY BUTTERFIELD.

REFERENCES CITED

The following references are of record in the file of this patent:

UNITED STATES PATENTS

| Number | Name | Date |
|---|---|---|
| Re. 4,981 | Weissenborn | July 16, 1872 |
| 1,490,801 | Collins | Apr. 15, 1924 |
| 1,504,574 | Egerton | Aug. 12, 1924 |
| 2,311,613 | Slayter | Feb. 16, 1943 |
| 2,355,304 | Koch | Aug. 8, 1944 |
| 2,379,468 | Arnold | July 3, 1945 |